No. 36,095.　　　　　　　　　　　　　　　　PATENTED AUG. 5, 1862.
G. A. KEENE.
FUNNEL MEASURE.
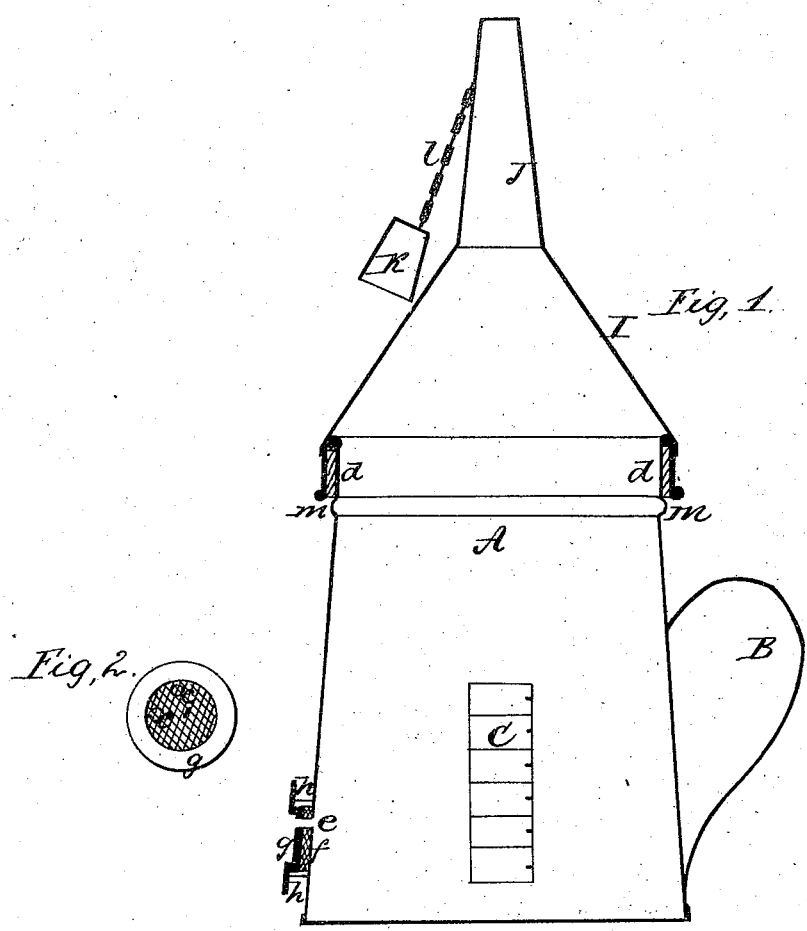

UNITED STATES PATENT OFFICE.

GEORGE A. KEENE, OF NEWBURYPORT, MASSACHUSETTS.

IMPROVEMENT IN FUNNEL MEASURES.

Specification forming part of Letters Patent No. 36,095, dated August 5, 1862.

*To all whom it may concern:*

Be it known that I, GEORGE A. KEENE, of Newburyport, in the county of Essex and Commonwealth of Massachusetts, have invented a new and useful Improvement in Tunnel Measures; and I do hereby declare that the following is a full, clear, and exact description of the construction and operation of the same, reference being had to the accompanying drawings, forming a part of this specification, in which—

Figure 1 is a longitudinal central section through the tunnel measure, handle, and vent; and Fig. 2 is a front view of the vent.

Like parts are indicated by the same letters in both drawings.

The nature of my invention consists in constructing a fluid-measure with an opening and closing vent on its side or bottom, and combining with said measure a tunnel rendered water-tight by means of the rubber or compressible band d, substantially as hereinafter described.

To enable others skilled in the art to make and use my improvement, I will now describe its construction and operation.

A is a measure, of the usual construction and any required capacity, provided with a handle, B, and a graduated glass window, C.

On one side and near the bottom of the measure is a vent, which may be readily opened or shut, and which consists of a short tube, h, soldered or otherwise fastened to the measure, and provided with a female screw to receive the cap or nut g. Between the nut g and the side of the measure is a disk, f, of india-rubber or leather, of the diameter of the inside of the tube h, and passing through the nut g, disk f, and the side of the measure is a small round hole or vent, as represented in the drawings.

In Fig. 1 the vent is represented as being open. In Fig. 2 (the nut being turned a little) the vent is represented as being closed, the hole through the disk and the side of the measure being in the position shown by the dotted circle e'.

Encircling the top of the measure, between the wired rim and the ridge m is a belt, d, of india-rubber or other suitable compressible packing.

I is a removable tunnel shaped substantially as shown in Fig. 1, the flange on the larger end being of the proper diameter to fit snugly and water-tight over the packing-belt d.

K is a removable cover attached to the nozzle J of the tunnel by means of a little chain, l, the object of this cover being to exclude dust and insects from the tunnel and measure when not in use.

The vent being closed and the tunnel removed, the liquid to be measured is turned or drawn into the measure A and the quantity indicated by the graduated glass C. The tunnel I is now placed on over the measure, as represented in Fig. 1, being rendered water-tight by means of the packing d. The end of the nozzle J may now be inserted into the nose of a bottle, jug, or other vessel, and the vent being opened, the measure and tunnel together left in a vertical position to empty and drain.

A tunnel measure thus constructed is simple, cheap, easily cleaned, and may be used either in combination, as above described, or as a separate tunnel and measure when required.

What I claim as my invention, and desire to secure by Letters Patent, is—

A fluid-measure with an opening and closing vent upon its side or bottom, and combining with said measure a tunnel, rendered water-tight by means of the packing d, substantially as described, and for the objects specified.

GEO. A. KEENE.

Witnesses:
 D. D. GREENLEAF,
 CUTTING PETTINGELL.